(No Model.)

H. R. KELLER.
CAR STARTER.

No. 384,368. Patented June 12, 1888.

WITNESSES.
W. H. Pumphrey.
Chas Helm.

INVENTOR.
Henry Richard Keller.
per Hallock & Hallock.
Attorney.

UNITED STATES PATENT OFFICE.

HENRY RICHARD KELLER, OF NEW ORLEANS, LOUISIANA, ASSIGNOR, BY DIRECT AND MESNE ASSIGNMENTS, OF TWO-THIRDS TO WILLIAM H. BELT AND OLIVER B. SANSUM, OF SAME PLACE.

CAR-STARTER.

SPECIFICATION forming part of Letters Patent No. 384,368, dated June 12, 1888.

Application filed December 3, 1887. Serial No. 256,917. (No model.)

*To all whom it may concern:*

Be it known that I, HENRY RICHARD KELLER, a citizen of the United States, residing at New Orleans, in the parish of Orleans and State of Louisiana, have invented certain new and useful Improvements in Car-Starters; and I do hereby declare the following to be a full, clear, and exact description of the invention, such as will enable others skilled in the art to which it appertains to make and use the same.

The object of the invention is to use a device to overcome the inertia of bodies at rest and set them in motion, and more particularly to facilitate the starting of street-cars and other wheeled carriages, cars, wagons, locomotives, tenders, and railway-cars, and thereby lessen and relieve the labor of animals or other motive power employed in producing and continuing the motion of the things above mentioned. To accomplish this, means are provided to exert force on the periphery of the wheel or wheels to start the car or other movable body and to release or trip the mechanism after the car has been started and set it for the operation.

The invention consists of constructions and combinations, all as will hereinafter be described in the specification and pointed out in the claims, reference being had to the accompanying drawings, in which—

Figure 1:
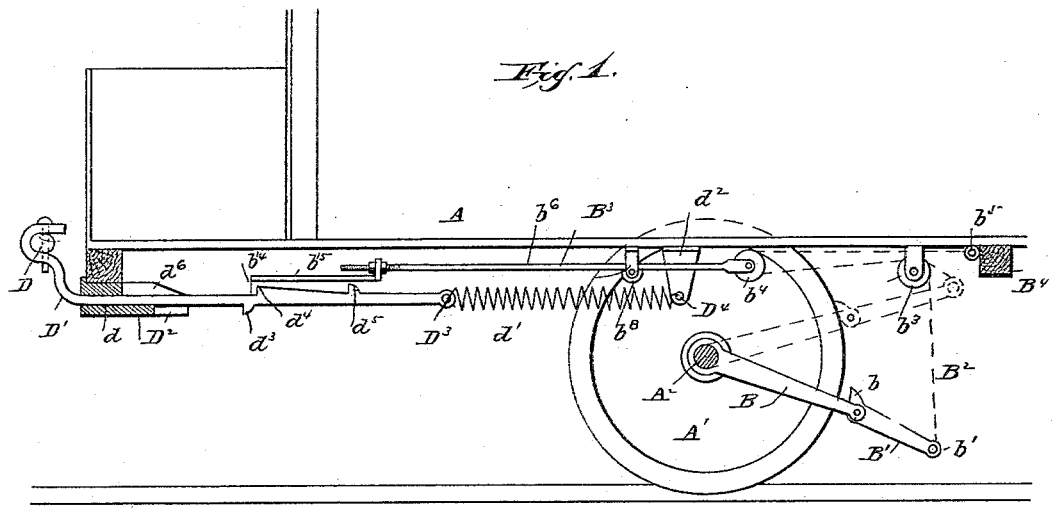
Figure 2:
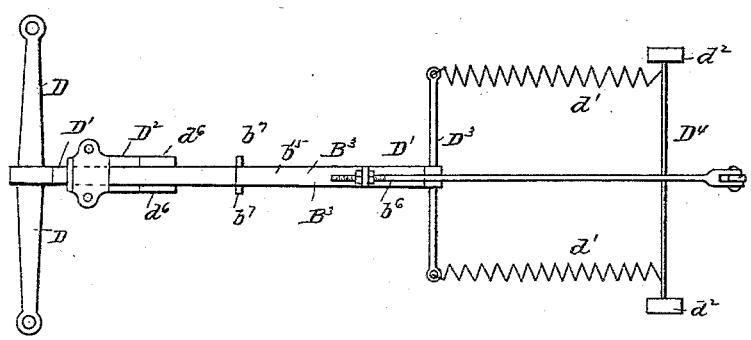

Figure 1 represents a longitudinal section of part of a car, and showing in elevation my device attached thereto; and Fig. 2, a plan of the release or tripping and setting mechanism.

The body to be moved may be of any desired form and is designated by the letter A, and is provided with wheels A' and axle A². Upon the axle is pivoted an arm, B, projecting rearwardly beyond the wheel, and to the distal end of which is fulcrumed an elbow-lever, B'. The short arm, $b$, of this lever is opposite to and in juxtaposition with the periphery of the wheel A', and the long arm, $b'$, projects rearwardly to any desired point, and is held in place by a cable, B². This cable is passed over pulley $b^3$, secured to the under side of the body, and around pulley $b^4$ on rod B³ to a hook, $b^5$, on beam B⁴, to give a fixed point for attaching this part of the cable. To press the arm $b$ of the lever B' against the periphery of the wheel, the bar B³ is drawn forward, so that the distance between the outer end of the lever and pulley $b^3$ is decreased; and if the draft upon bar B³ be continued, and of sufficient force, the lever will cause the wheels to turn and move the body A.

The power necessary to accomplish the object of the invention in the device shown is derived through the singletree D, to which the horse or other motive power is attached. This singletree is attached to a draw-bar, D', passing through a draw-head or slot, $d$, in the draw-bar frame or head D², and secured at its rear end to a cross-rod, D³, connected by retracting-springs $d'$ $d'$ to a bar, D¹, on brackets $d^2$ $d^3$, fixed to the under side of the car. The bar D' is provided with a projection, $d^3$, which limits the forward movement of the bar; a projection, $d^4$, to catch the lip $b^{14}$ on the bar B³, and a projection, $d^5$, to serve as a stop for the lip $b^{14}$ when it slides upon the bar D'.

The bar B³ is composed of two parts, $b^{15}$ and $b^6$, adjustable upon each other. The part $b^{15}$ is provided with a screw-threaded opening for the screw-threaded stem upon the part $b^6$, by which means the bar B³ is lengthened or shortened, as may be desired. The part $b^{15}$ has also a lip, $b^{14}$, provided with lateral projections $b^7$, which, when the draw-bar is drawn forward, slide upon the inclined faces or jaws $d^6$ on the upper side of the draw-bar frame D² to release the catch from the projection $d^4$ and permit the lever B' by its weight to fall away from the wheel and set itself for the next operation. The bar B³ can be supported by any suitable means, and in the present instance is held in place by two rollers, $b^8$, supported from the bottom of the body A.

The operation of the device is as follows: The draft-animal or other motor pulls out the draw-bar D'. The bar B³ is drawn forward by means of the catch $d^4$, which operates upon the lip $b^{15}$. The draw-bar transmits the motion through the chain or cable to the long arm of the lever, and forces the short arm against the periphery of the wheel and moves upward, as shown in dotted lines, Fig. 1, and thereby causes the wheels to revolve readily and relieves the draft-animal or other motive power. As the bar $B^3$ moves toward the draw-head, the projection $b^7$ of the lip $b^{14}$ slides up the inclined jaws or faces $d^6$ on the draw-head and disengages the lip $b^{14}$ from the catch or projection $d^4$. This disengagement or tripping of the bar $B^3$ from the draw-bar leaves the lever free to fall to its normal position, and thus release the force from the wheel or wheels as soon as the body is in motion. The projection $d^3$ by striking the draw-head stops the forward movement of the draw-bar and bears the stress of the draft. When the body is stopped, the draft upon the draw-bar is slackened or relieved, and the springs pull the draw-bar back to the lip $b^{14}$, which being at rest engages with the projection $d^4$ on the draw-bar, and is ready to repeat the same operation when the draw-bar is moved forward.

What I claim as new is—

1. The combination of a body having wheels and axles, a bar pivoted upon said axle, a lever fulcrumed upon the end of the bar and having its short arm opposite the periphery of the wheel and its long arm secured to a chain or cable, which in turn is secured to the body, a bar having a pulley for said chain or cable, and a draw-bar connected with said bar, substantially as described.

2. The combination of the body having wheels and axles, the clutching-lever, the draw-head and rollers on it, the draw-bar moving in said draw-head, the connecting device between the clutching-lever and the draw-bar and having a tripping-connection with said draw-bar, substantially as described.

3. The combination of the body having wheels, the clutching-lever, the draw-head having inclined faces, the draw-bar connected with the clutching-lever and having the retracting-springs, and the tripping device operated upon by the inclined faces upon the draw-head, substantially as described.

In testimony whereof I affix my signature in presence of two witnesses.

HENRY RICHARD KELLER.

Witnesses:
THOS. HUNTON,
ERNEST L. SANSUM.